Figure 1:
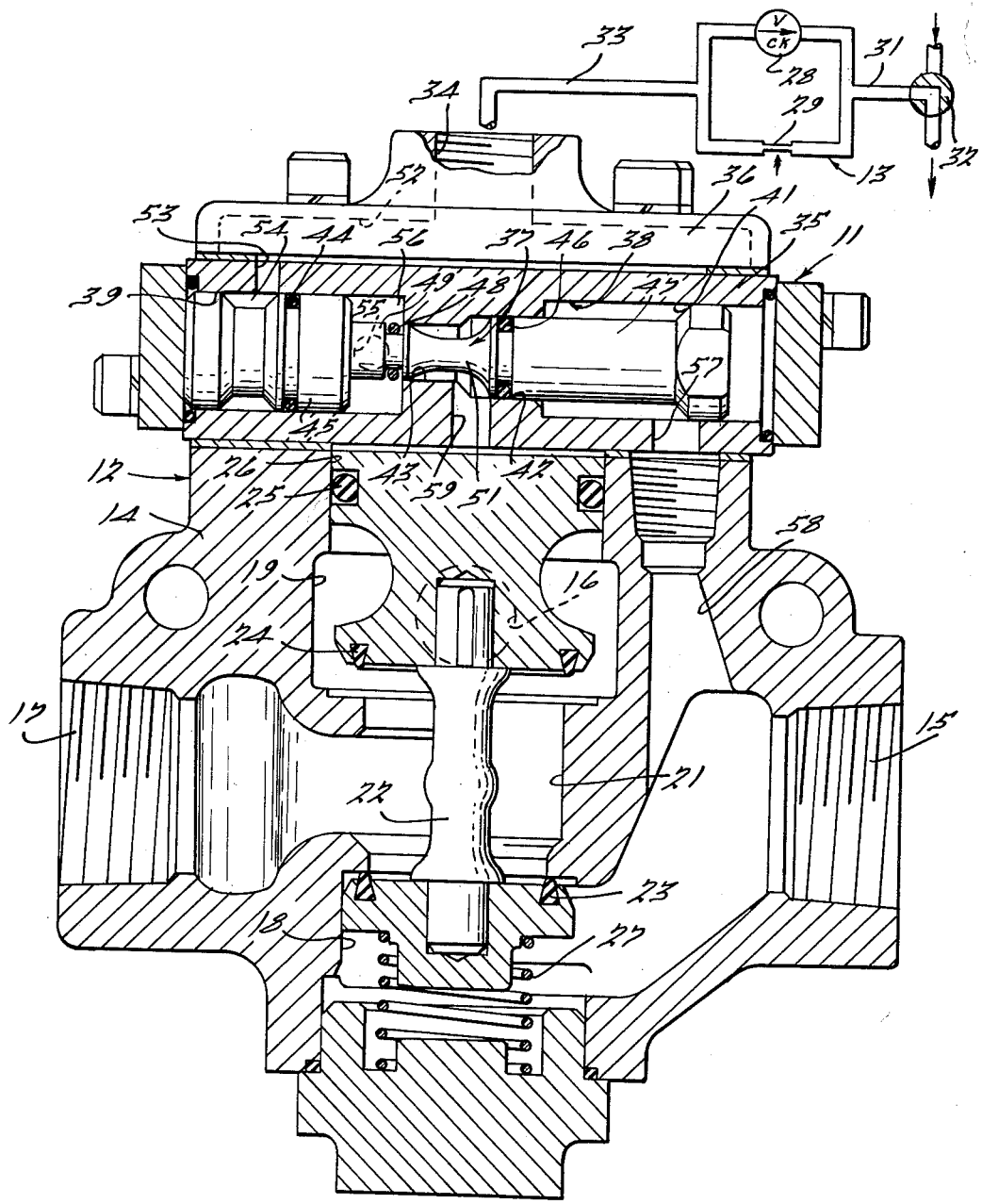

May 5, 1964

D. B. ABBOTT ETAL 3,131,722

VALVE

Filed Nov. 27, 1961

2 Sheets-Sheet 1

INVENTORS
Daniel B. Abbott
Edwin P. Brinkel
BY
Barnes, Dickey & Pierce
ATTORNEYS

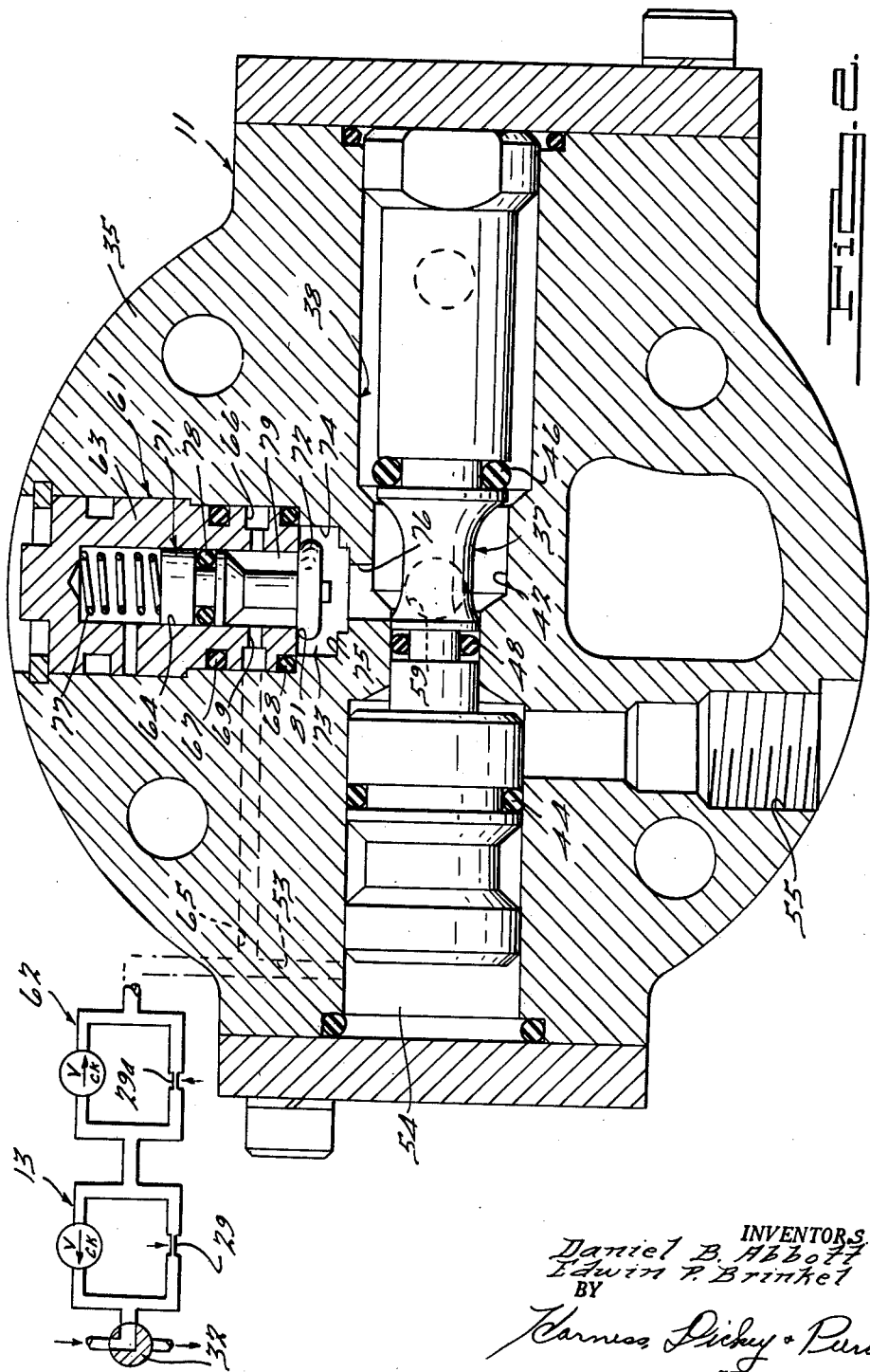

United States Patent Office 3,131,722
Patented May 5, 1964

3,131,722
VALVE
Daniel B. Abbott, Clawson, and Edwin P. Brinkel, Royal Oak, Mich., assignors to Ross Operating Valve Company, Detroit, Mich., a corporation of Michigan
Filed Nov. 27, 1961, Ser. No. 154,990
8 Claims. (Cl. 137—625.6)

This invention relates to valves, and more particularly to pressure-actuated three-way valves of the type shiftable between a first position connecting a working port to fluid pressure, and a second position connecting the working port to exhaust.

It is an object of the present invention to provide a novel and improved three-way valve construction which will shift rapidly in either direction between its supply and exhaust positions, even when the fluid flow for actuating the valve in one or both directions is timed or metered.

It is another object to provide an improved valve construction of this nature in which the quick-shifting character is inherent in the basic valve construction itself, and in which no additional elements or accessories are necessary.

It is also an object, in one form of the invention, to provide an improved valve unit having the above characteristics, in which the upper and lower valve-actuating pressure limits will be immediately attained each time the valve is shifted, thus insuring complete uniformity of valve timing during the working day in instances where the valve has a delayed shift in both directions and reversing of the signal valve occurs very soon after shifting of the main valve.

Other objects, features, and advantages of the present invention will become apparent from the subsequent description, taken in conjunction with the accompanying drawings, in which:

FIGURE 1 is a partially schematic cross-sectional view in elevation of a suitable embodiment of the invention mounted on a piston-operated three-way main valve of the open-center crossover type, the valve of this invention being used to adapt the main valve for quick shifting where the signal is time-delayed in one direction; and FIGURE 2 is a partially schematic cross-sectional view of a modified form of the invention in which an auxiliary valve is used in conjunction with the quick-shift valve so as to bring the valve actuating pressure to its upper and lower limits immediately upon shifting of the valve, this construction being shown as combined with a system in which the signal is time-delayed in both directions.

In general terms, the first illustrated embodiment of the invention comprises a three-way spool valve of the closed center crossover type with a first actuating chamber at one end connected to a source of constant fluid pressure and a second actuating chamber at the other end connected to a signal port. The latter may be connected to means for metering the fluid flow in one or both directions, thus causing a time-delayed shift of the valve spool. The valve is illustrated as having a working port connected to the piston chamber of a main valve actuating piston and may be termed an adapter valve in that it adapts the main valve for quick shifting between its positions, even though this shifting may be delayed with respect to the signal.

The exhaust port of the adapter valve is disposed adjacent the signal port, with a relatively large seal area between these ports. The working port is disposed adjacent the inlet port, with a valve seal area between these ports smaller than the first mentioned seal area. A third seal area is provided between the working and exhaust ports, this last seal area being smaller than the other two. The axial spacing between the second and third seal areas is such that the second seal area, termed the inlet valve, will move to its closed position before the third seal area, termed the exhaust valve, will move to its open position. When the spool is moving in the opposite direction, the exhaust valve will close before the inlet valve opens.

With this arrangement, upon a decrease in signal pressure the inlet pressure will cause rapid shifting of the adapter valve spool toward its exhaust position as soon as the exhaust valve cracks open. Similarly, upon an increase in signal pressure, the adapter valve spool will shift quickly to its full inlet position as soon as the inlet valve cracks open.

In another embodiment of the invention, an auxiliary valve is provided in conjunction with this adapter valve spool, the auxiliary valve comprising a poppet valve having one seat connected to the working port of the adapter valve spool and its other seat connected to the signal port, the space between these two seats of the poppet valve being sufficient to connect the two seats when the poppet valve shifts between its positions. The auxiliary or poppet valve is spring-urged toward a position closing the seat connected with the working port of the adapter valve spool, and the seat connected to the signal port is also connected to an effective poppet valve end area created by a seal which urges it in the other direction.

When the signal pressure is reduced sufficiently to cause shifting of the adapter valve spool to its exhaust position, the auxiliary valve will shift toward a position closing the connection to the adapter valve spool working port, and when so shifting, the auxiliary valve will cause the signal chamber to be temporarily connected to the exhaust port, thus immediately reducing the signal pressure in the chamber to zero. When the signal pressure is increasing, shifting of the adapter valve spool to its inlet position will cause shifting of the auxiliary valve against its spring force, and this time the signal chamber will be temporarily connected to full inlet pressure by the shifting of the auxiliary valve, thus immediately bringing the signal chamber to full pressure.

Referring more particularly to the drawings, the adapter is generally indicated at 11 and is shown as being mounted on a main valve generally indicated at 12, the signal to the adapter being connected through a time delay or metering unit indicated generally at 13.

Main valve 12 comprises a body 14 having an inlet port 15 connected to a source of constant pressure, an exhaust port 16 and a working port 17. Inlet port 15 is connected to a lower chamber 18 and exhaust port 16 is connected to an upper chamber 19, working port 17 being connected to a central chamber 21. A main valve spool 22 is disposed within body 14, this spool carrying an inlet valve 23 between chambers 18 and 21, and an exhaust valve 24 between chambers 21 and 19. A piston 25 is provided at the upper end of spool 22, the piston being slidable within a chamber 26. A helical spring 27 is disposed at the lower end of body 14 and urges spool 22 upwardly.

Main valve 12 may be termed a three-way open center crossover valve, in that inlet chamber 18 is connected to exhaust chamber 19 during the time it takes for spool 22 to shift between its inlet and exhaust positions. It is therefore necessary that main valve 12 be shifted as rapidly as possible between its positions, since a substantial amount of fluid pressure might otherwise be lost, and other effects such as erosive action on the valve elements due to the slow shifting would occur.

Time delay unit 13 comprises a one-way check valve 28 and an adjustable restriction 29 in parallel relation, these elements having a connection 31 to a signal valve 32 and another connection 33 to a signal port 34 for adapter 11. Check valve 28 is adapted to permit unrestricted flow in one direction but to prevent flow in the other direction. As shown, check valve 28 will only permit flow away from signal port 34. A time delay valve unit of this type is shown in copending application Serial No. 153,166, filed November 17, 1961, in the name of Walter C. Kesselring, and assigned to the assignee of the present application. Signal valve 32 may be a manually operated or power controlled three-way valve.

If signal port 34 were to be connected directly to chamber 26 of main valve operating piston 25, downward shifting of main valve spool 22 would not begin until sufficient pressure had been built up in chamber 26, the time taken for this pressure build-up depending upon the setting of restriction 29 which is normally of an adjustable type. When the pressure had been built up sufficiently, the downward movement of spool 22 would be relatively slow, since the pressure would be building up at a metered rate. This would cause the difficulties with respect to pressure loss and erosion described above. Upward shifting of valve spool 22 upon release of pressure in chamber 26 would of course be rapid in the illustrated embodiment, since check valve 28 would permit unrestricted flow of signal pressure to exhaust.

Adapter valve unit 11 comprises a body 35 having flat upper and lower surfaces and adapted to be mounted on the flat upper surface of main valve body 14. A cap 36 is mounted on the upper surface of body 35 and carries port 34. A spool 37 is slidably mounted in body 35, the spool being movable in a direction parallel to the flat upper and lower surfaces of body 35. Spool 37 is disposed within a bore in body 35, this bore being generally indicated at 38 and comprising a relatively large first section 39 at the left end of the bore, as seen in FIGURE 1, and a relatively large second section 41 at the right end. For assembly purposes, spool 37 may likewise be constructed of two separate sections disposed within bore sections 39 and 41. Bore section 41 leads into a somewhat smaller bore section 42 which may be termed the inlet valve seat. An even smaller bore section 43 connects bore sections 42 and 39; section 43 may be termed the exhaust valve seat.

Spool 37 carries a first annular seal 44 on a first spool section 45 disposed within bore section 39, a second annular seal 46 on a spool section 47 disposed within bore section 41 but partially movable into bore section 42, and a third annular seal 48 on a spool section 49 movable between bore sections 43 and 39. A spool section 51 of reduced diameter is formed between seals 46 and 48. Spool 37 is sealed within the various bore sections only at seals 44, 46 and 48, the remainder of the spool having clearance with respect to the respective bores to permit air flow.

The hollow interior 52 of cap 36 is connected with a signal port 53 in the upper surface of body 35 leading to the left hand portion of bore section 39, this portion of the bore thus constituting a signal pressure chamber 54. An exhaust port 55 is connected to the right hand portion of bore section 39, this right hand portion thus forming an exhaust chamber 56. An inlet port 57 leads upwardly from the lower surface of housing 35 to bore section 41, this bore section thus constituting an inlet chamber. In the illustrated embodiment, main valve body 14 has a passageway 58 leading upwardly from constant pressure inlet chamber 18.

The central portion of housing 35 has a downwardly extending port 59 connecting bore section 42 with chamber 26 containing main valve piston 25, bore section 42 thus forming the working chamber of unit 11.

The effective area of seal 44 is substantially greater than that of seal 46 which constitutes the inlet valve, and exhaust valve seal 48 is substantially smaller in effective area than seal 46. The axial spacing between valves 46 and 48 is such that when spool 37 moves leftwardly toward its FIGURE 1 position, valve 46 will close just before valve 48 opens. When moving in the other direction, valve 48 will close just before valve 46 opens.

In operation, assuming an initial condition in which valve 32 is connected to exhaust, main valve 12 will be in the exhaust position shown in FIGURE 1, and spool 37 of adapter valve 11 will be in its left-hand position, with working port 59 connected to exhaust port 55, spool 37 being held in this position by pressure in bore section 41.

Upon actuation of signal valve 32 to its inlet position, fluid pressure will build up at a metered rate in chamber 54, the rate being controlled by the setting of restriction 29. When the force on seal area 44 has counterbalanced and finally exceeded the force on seal 46, spool 37 will begin to move slowly to the right.

This slow movement will continue only until exhaust valve seal 48 has engaged exhaust valve seat 43 and, as will happen, immediately thereafter, inlet valve seal 46 begins to leave inlet valve seat 42.

As soon as the latter event occurs, fluid from inlet chamber 41 will rapidly flow into working bore section 42, thus equalizing the pressure on both sides of seal 46. The area of seal 44 being substantially larger than that of seal 48, valve spool 37 will quickly shift completely to its right-hand position. This assumes of course that the pressure in chamber 54 is compressible, or that an accumulator is in the system to maintain the fluid pressure in this chamber during shifting of the spool.

It should be noted that spool 37 will begin to accelerate its movement to the right as soon as pressure begins to build up in bore section 42, and even before the pressures in bore sections 42 and 41 are fully equalized. This is because of the fact that the area of seal 46 is greater than that of seal 48.

The effect on main valve 12 will thus be to shift the main valve quickly from its upper or exhaust to its lower or inlet position, since the rapid opening of adapter inlet valve 46 will provide rapid pressure buildup in main valve actuating chamber 26.

When signal valve 32 is moved to its exhaust position, the pressure in chamber 54 will rapidly approach zero. The pressure in bore sections 41 and 42 will thus quickly shift adapter valve spool 37 leftwardly to its exhaust position, and main valve actuating chamber 26 will thus likewise be rapidly evacuated, causing quick upward shifting of main valve 12 to its exhaust position.

Should the position of time controlled unit 13 be reversed so as to provide a timed-out flow; that is, with check valve 28 positioned reversely from its FIGURE 1 position, the action will be as follows: Assuming again an initial condition in which signal valve 32 is in its exhaust position, main valve spool 22 will again be in its FIGURE 1 position with adapter valve spool 37 in its left-hand position. Upon movement of signal valve 32 to its inlet position, the rapid pressure buildup in chamber 54 will cause quick rightward shifting of spool 37, since seal area 44 is larger than seal area 46. Main valve 12 will thus also move downwardly to its supply position in a quick manner. Movement of signal valve 32 to its exhaust position will cause gradual reduction of pressure in chamber 54. Valve spool 37 will move slowly to the left until inlet valve 46 closes and exhaust valve 48 begins to open. As soon as valve 48 begins to open, working bore section 42 will be evacuated, the pressure in bore section 41 exerted on the area of seal 46 will overcome the decreasing pressure on seal area 44, and valve spool 37 will move rapidly to the left. Spool 37 will actually begin its acceleration as soon as pressure begins to be reduced in bore section 42 because of the pressure differential established across seal 46. Main valve actuating chamber 26 will thus be rapidly evacuated, and the main valve will move quickly from its supply to its exhaust position as shown in FIGURE 1.

FIGURE 2 shows a modified form of the invention in which an auxiliary valve, generally indicated at 61, is used in conjunction with adapter unit 11. This embodiment is intended for systems in which both a timed-out metering unit 13 and a timed-in metering unit 62 are connected between signal valve 32 and adapted signal chamber 54.

Auxiliary valve 61 comprises a body 63 mounted within body 35 and having a bore 64 extending transversely to bore 38 within which valve spool 37 is mounted. A passageway indicated schematically at 65 is connected between signal port 53 and an annular chamber 66 on body 63, this chamber being formed by seals 67 and 68 and being connected with bore 64 by radial passages 69.

An auxiliary valve spool generally indicated at 71 is slidably mounted within bore 64. The outer end of spool 71 carries a poppet valve 72, this valve being disposed within a transfer chamber 73 formed between the inner end of body 63 and the inner end 74 of the recess in which valve 61 is disposed. Valve 72 is engageable with a valve seat 75 at the inner end of chamber 73, this valve seat being connected to working chamber 42 of adapter unit 11 by a passage 76. A helical spring 77 within bore 64 urges valve spool 71 in a direction causing engagement of valve 72 with seat 75.

Valve spool 71 carries a seal 78 within bore 64, and pressure within chamber 79 formed by this seal will urge valve 71 upwardly in FIGURE 2, causing valve 72 to engage a valve seat 81 formed by the inner end of body 63. The outer diameter of valve 72 is considerably smaller than the diameter of chamber 73, so that in moving between seats 75 and 81, there will be substantial communication for fluid flow between passage 76 and chamber 79, the latter chamber being connected to radial ports 69 and thus to signal chamber 54.

In operation of the embodiment to FIGURE 2, assuming an initial condition in which signal valve 32 is connected to exhaust, valve spool 37 will be in its left-hand position and valve spool 71 will be in its downward position, with valve 72 engaging seat 75. A main valve 12 (not shown in FIGURE 2) connected to working port 59 will of course be in its exhaust position at this time.

Upon movement of signal valve 32 to its supply position, pressure will begin to build up gradually in chamber 54. Pressure will also build up in chamber 79 of auxiliary valve 61, but since the area of valve seat 75 is greater than that of seal 78, valve spool 71 will not shift upwardly.

However, as soon as exhaust valve 48 closes and inlet valve 46 opens, in the manner described with respect to FIGURE 1, pressure will be exerted on the underside of valve 72, and valve spool 71 will shift upwardly. In so doing, the fluid pressure in working chamber 42 (obtained by the rapid rightward shifting of valve spool 37) will pass through passageway 76 and chamber 73, around valve 72, into chamber 79, and through passageways 69, 65 and 53 to chamber 54. Full line pressure will thus be immediately provided for chamber 54. Auxiliary valve 71 will be moved to its extreme upward position in FIGURE 2 because of the pressure in chamber 79 (received from chambers 42 and 73 as described above) acting on seal 78 against spring 77.

When signal valve 32 is shifted to its exhaust position, pressure will gradually be decreased in signal chamber 54. The starting point of this gradual pressure decrease will be full line pressure, regardless of how quickly signal valve 32 is shifted to exhaust after adapter valve spool 37 has shifted to the right (and main valve 12 has shifted to its supply position).

As the pressure in chamber 79 gradually decreases after signal valve 32 is shifted to exhaust, auxiliary valve spool 71 will remain in its upper position as long as adapter valve spool 37 has not shifted to the left, since full line pressure will be exerted upon the area formed by valve seat 81.

After the pressure in signal chamber 54 has dropped sufficiently to cause leftward movement of valve spool 37 until valve 46 closes and valve 48 begins to open, rapid leftward movement of valve spool 37 will occur as previously described. This will connect chamber 73 to exhaust, and spring 77 will move valve spool 71 downwardly, seat 81 having a larger effective area than seal 78.

During the downward movement of valve spool 71, the remaining fluid pressure in signal chamber 54 will be rapidly reduced to zero by flow through passages 53, 65 and 69, chambers 79 and 73, and passage 76 to exhaust. When signal valve 32 is next shifted to its supply position, the pressure buildup in signal chamber 54 will therefore start from zero, regardless of how soon after adapter 11 and main valve 12 have shifted to their exhaust position the signal valve is again actuated.

The advantages of the embodiment of FIGURE 2 are mainly in the achievement of uniformity of the timing cycle, especially where the following conditions exist:

(1) There is a timed-in and a timed-out system.

(2) Reversing of the signal valve occurs very soon after shifting of the main valve.

(3) The system pressure is reduced to zero when not in operation, for example at night, the timing being important from the instant the line pressure is turned on in the morning.

If the signal pressure were metered only in one direction, the pressure in chamber 54 would always reach either zero (if the signal pressure is timed-in) or full line pressure (if the signal pressure is timed-out). The timing period for all cycles could thus be made uniform by proper adjustment of restriction 29 or 29a.

Similarly, auxiliary valve 61 would be unnecessary if sufficient time elapsed between each shift of main valve 12 and the subsequent shift of signal valve 32, since the pressure in chamber 54 would be permitted to reach zero or full line pressure. Lastly, if the system were never shut down, or if timing when the system is initially repressurized were unimportant, auxiliary valve 61 would not be advantageous, since properly uniform timing periods could be attained by adjusting restrictions 29 and 29a in timing units 13 and 62 respectively.

However, when the above described three conditions are present, absence of auxiliary valve 61 would have the following result: Assuming for example that signal and line supply pressure had been reduced to zero in that order during shutdown of the system, valve spool 37 would be in its left-hand position and valve spool 71 in its lower position in FIGURE 2. Upon return of line pressure and subsequent initial shifting of signal valve 32 to its supply position, pressure in chamber 54 would build up at a uniform rate dependent upon the setting of restriction 29. When the pressure in chamber 54 would have reached, say, 80% of line pressure, valve spool 37 would suddenly shift to the right as described with respect to FIGURE 1. This would shift main valve 12 downwardly, say, eight seconds after valve 32 would have been shifted, assuming it took eight seconds for fluid flowing through restriction 29 to build up to 80% of line pressure.

Assume that immediately after valve spools 37 and 22 had shifted, signal valve 32 would be shifted to its exhaust position. Pressure would begin to decrease in chamber 54 from the starting point, that is, from 80% of line pressure or slightly thereabove. When the pressure in chamber 54 would have reached perhaps 20% of line pressure, valve spool 37 would shift rapidly to the left. This portion of the cycle would then have taken, let us say, six seconds.

Assuming that valve 32 is shifted immediately thereafter to its supply position, pressure buildup in chamber 54 would again occur, but this time it would start from 20% of line pressure instead of from zero pressure. When the pressure in chamber 54 reached 80%, valve spool 37 would again shift to the right. Thus, valve spool 37, and therefore main valve spool 22, would have been in their exhaust position for eight seconds in the first cycle, but for only six seconds in the second cycle and in all cycles thereafter. This is because the starting point for chamber 54 would have been zero pressure at the beginning of the first cycle but 20% of line pressure for the beginning of the remaining cycles.

With the presence of auxiliary valve 61, however, the cycle will always start with chamber 54 at zero pressure when valve spool 37 is in its left-hand position or at full line pressure when valve spool 37 is in its right-hand position.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In combination, a three-way valve member having an inlet valve and an exhaust valve and movable between a supply position and an exhaust position, a first chamber conectable to a source of constant pressure and adapted to urge said valve member toward one of said poistions, an alternately pressurizable and exhaustable signal chamber adapted when pressurized to urge said valve member toward the second of said positions, means forming part of said valve member and responsive to partial movement of the valve member a predetermined distance from said first to said second position for causing rapid shifting of the valve member the remaining distance toward said second position, and means forming part of said valve member and responsive to partial movement of the valve member a predetermined distance from said second to said first position for causing rapid shifting of the valve member the remaining distance toward said first position.

2. In combination, a valve spool, a supply chamber formed at one end of said valve spool and connectable to a source of constant pressure, a signal chamber formed at the other end of said valve spool and connectable alternately to pressure and exhaust, axially spaced inlet and exhaust valves carried by said spool, a working port connected between said valves, an exhaust port connected between said exhaust valve and said signal chamber, and a seal separating said exhaust port and said signal chamber, the relative areas of said valves and seal being such that initiation of opening of said inlet valve will cause the valve spool to shift rapidly to fully open the inlet valve, and initiation of opening of said exhaust valve will cause the valve spool to shift rapidly to fully open the exhaust valve.

3. In combination, a valve spool, a valve body slidably supporting said spool, a first seal on said spool forming a signal chamber in said body at one end of the spool, an inlet chamber formed at the other end of said spool and connectable to a source of constant pressure, a working chamber between said inlet and signal chambers, a seal forming an inlet valve between said inlet and working chambers, the effective seal area of said inlet valve being less than the effective seal area of said first seal, an exhaust chamber between said working chamber and signal chamber, and a seal forming an exhaust valve on said spool between said working and exhaust chambers, the effective area of said exhaust valve being less than the effective area of said inlet valve.

4. The combination according to claim 3, said valve spool being movable between supply and exhaust positions, the axial spacing between said inlet and exhaust valves being such that when said valve spool moves to its exhaust position said inlet valve will close before said exhaust valve opens and when said valve spool is moved to its supply position said exhaust valve will close before its inlet valve opens.

5. The combination according to claim 4, further provided with means responsive to shifting of said valve spool to one position for applying full-line pressure to said signal chamber, and means responsive to shifting of said valve spool to its other position for reducing to zero the pressure in said signal chamber.

6. In combination, a valve spool, a valve body slidably supporting said spool, a first seal on said spool forming a signal chamber in said body at one end of the spool, an inlet chamber formed at the other end of said spool and connectable to a source of constant pressure, a working chamber between said inlet and signal chambers, a seal forming an inlet valve between said inlet and working chambers, the effective seal area of said inlet valve being less than the effective seal area of said first seal, an exhaust chamber between said working chamber and signal chamber, a seal forming an exhaust valve on said spool between said working and exhaust chambers, the effective area of said exhaust valve being less than the effective area of said inlet valve, a signal valve conected to said signal chamber and movable between supply and exhaust positions, and a time-control unit for metering fluid flow in at least one direction between said signal valve and signal chamber.

7. In combination, a valve spool, a valve body slidably supporting said spool, a first seal on said spool forming a signal chamber in said body at one end of the spool, an inlet chamber formed at the other end of said spool and connectable to a source of constant pressure, a working chamber between said inlet and signal chambers, a seal forming an inlet valve between said inlet and working chambers, the effective seal area of said inlet valve being less than the effective seal area of said first seal, an exhaust chamber between said working chamber and signal chamber, a seal forming an exhaust valve on said spool between said working and exhaust chambers, the effective area of said exhaust valve being less than the effective area of said inlet valve, a signal valve connected to said signal chamber and movable between supply and exhaust positions, a time-control unit for metering fluid flow in at least one direction between said signal valve and signal chamber, a main valve shiftable between first and second positions, and a piston for operating said main valve connected to said working chamber.

8. In combination, a valve spool, a valve body slidably supporting said spool, a first seal on said spool forming a signal chamber in said body at one end of the spool, an inlet chamber formed at the other end of said spool and connectable to a source of constant pressure, a working chamber between said inlet and signal chambers, a seal forming an inlet valve between said inlet and working chambers, the effective seal area of said inlet valve being less than the effective seal area of said first seal, an exhaust chamber between said working chamber and signal chamber, a seal forming an exhaust valve on said spool between said working and exhaust chambers, the effective area of said exhaust valve being less than the effective area of said inlet valve, an auxiliary valve having a first port connected to said working chamber and a second port connected to said signal chamber, said auxiliary valve being movable between first and second positions in each of which it disconnects said first and second ports and also movable to an intermediate position connecting said first and second ports, means responsive to shifting of said valve spool to one position for shifting said auxiliary valve from its first position through its intermediate position to its second position, and means responsive to movement of said valve spool to another position for shifting said auxiliary valve from its second position through its intermediate position to its first position.

References Cited in the file of this patent

UNITED STATES PATENTS

| 2,916,019 | Murphy | Dec. 8, 1959 |
| 2,993,511 | Johnson | July 25, 1961 |
| 2,997,064 | Gerwig et al. | Aug. 22, 1961 |
| 2,997,066 | Brinkel | Aug. 22, 1961 |
| 3,009,480 | Miller | Nov. 21, 1961 |